(12) United States Patent
Yi et al.

(10) Patent No.: US 11,339,293 B2
(45) Date of Patent: May 24, 2022

(54) NON-PETROLEUM BASED REJUVENATING AGENT

(71) Applicants: Weihong Yi, Toronto (CA); Yi Xin Li, Toronto (CA)

(72) Inventors: Weihong Yi, Toronto (CA); Yi Xin Li, Toronto (CA)

( * ) Notice: Subject to any disclaimer, the term of this patent is extended or adjusted under 35 U.S.C. 154(b) by 382 days.

(21) Appl. No.: 16/456,037

(22) Filed: Jun. 28, 2019

(65) Prior Publication Data
US 2020/0407560 A1    Dec. 31, 2020

(51) Int. Cl.
*C08L 91/00*    (2006.01)

(52) U.S. Cl.
CPC ........... *C08L 91/00* (2013.01); *C08L 2555/64* (2013.01)

(58) Field of Classification Search
None
See application file for complete search history.

(56) References Cited

U.S. PATENT DOCUMENTS

| 5,719,216 A | * | 2/1998 | Schermer | C08K 5/375 |
| | | | | 524/59 |
| 2010/0041798 A1 | * | 2/2010 | Nigen-Chaidron | C08L 91/00 |
| | | | | 524/68 |
| 2017/0190898 A1 | * | 7/2017 | Puchalski | C08L 91/00 |

OTHER PUBLICATIONS

STIC Search performed Sep. 16, 2021 (Year: 2021).*

* cited by examiner

*Primary Examiner* — Colin W. Slifka
(74) *Attorney, Agent, or Firm* — Ridout & Maybee LLP

(57) ABSTRACT

The invention provides a non-petroleum based rejuvenating agent to improve the performance of the recycled asphalt, and accordingly extend the service life of the recycled pavement.

5 Claims, No Drawings

NON-PETROLEUM BASED REJUVENATING AGENT

1. FIELD

The invention relates to the field of hot recycling of asphalt pavement, in particular to a non-petroleum based rejuvenating agent.

2. BACKGROUND TECHNOLOGY

Every year, tens of millions tons of asphalt pavement materials are replaced in road renovation and reconstruction. The optimum solution is to recycle these old materials by asphalt recycling technology. The traditional recycling of asphalt mixtures is to soften aged asphalt by adding petroleum-based rejuvenating agent, so as to achieve the purpose of reduction.

The petroleum based rejuvenating agent is categorized as petroleum products. As the raw material is light oil, which is very volatile under the action of wind, heat, light and other nature conditions, and the aromatic content is easy to oxidize, this kind of regenerated agent cannot exist stably in asphalt for a long time, and the improvement of the mixture performance is only a short-term behavior. Also, it contains asphaltine and colloid, resulting in its insufficient capacity of improving three indicators of asphalt during reduction of aged asphalt. It usually fails to meet the reduction standard, especially asphalt ductility is difficult for reduction; In the production and construction of hot recycling, due to the short recycling mixing duration, the insufficient action of rejuvenating agent and the weak reduction ability, the old asphalt cannot be softened quickly, which leads to the recycled pavement quality below the design standard. The old asphalt mixtures recycled with petroleum based rejuvenating agent have poor anti-aging performance. As a result, the effective service period of recycled asphalt pavement with such mixture is relatively short, which tends to age again after 2 years of use.

Moreover, the raw materials for petroleum based rejuvenating agent lie in the lower layer products from backward crude oil refining equipment. However, under the general situation of national innovation and development, the old refining equipment will inevitably be eliminated. As a result of the continuous development of petroleum refining equipment, a new generation of petroleum refining equipment will no longer produce such ancillary products, and such lower level ancillary products will decrease day by day; In recent years, the State has vigorously promoted the use of recycled road materials, so the amount of rejuvenating agents will certainly show an upward trend. In the situation of "demand exceeding supply", it is urgent to develop a product that can replace petroleum based rejuvenating agents. Therefore, the existing technology needs to be further improved and developed.

3. SUMMARY OF THE INVENTION

In view of the shortcomings of existing technology as above, the invention provides a non-petroleum based rejuvenating agent to improve the performance of the recycled asphalt, and accordingly extend the service life of the recycled pavement.

In order to solve the technical problems as above, the technical proposal of the invention includes:

A kind of non-petroleum based rejuvenating agent, comprising the following components in percentage:

40 to 80 percent of treated edible recovered oil, 10 to 50 percent of matrix asphalt, 0.1 to 5 percent of stabilizer and 0.1 to 5 percent of antioxidant.

The said non-petroleum based rejuvenating agent, where the matrix asphalt as above-mentioned is either No. 90 or No. 70 road petroleum asphalt.

The said non-petroleum based rejuvenating agent, where the stabilizer as above-mentioned is diaryl disulfide.

The said non-petroleum based rejuvenating agent, where the antioxidant as above-mentioned is Tetra [3-(3,5-di-tert-butyl-4-hydroxyphenyl) propionic acid]pentaerythyl alcohol ester, or tri(2,4-di-tert-butylphenyl) phosphite ester, or the both.

The said non-petroleum based rejuvenating agent, where the treated edible recovered oil as above-mentioned is obtained from the edible recovered oil by dehydration, slag removal, color removal and flavor removal, and colloid removal processes.

Colloid removal process refers to treatment by one of the following methods: membrane separation, hydration, acid refining and mildew degelation.

The invention provides a non-petroleum based rejuvenating agent, in which the edible recovered oil is applied to the aged asphalt recycling technology. This synthesis form, with edible recovered oil as a carrier, produces an efficient non-petroleum based rejuvenating agent, which not only reduces the consumption of petroleum as non-renewable resources, but also solves the difficult problem of edible recovered oil treatment for food safety and environmental protection. The non-petroleum based rejuvenating agent in the invention can quickly soften the old asphalt, and also achieve the expected reduction effect under the condition of hot in-place recycling by short blending. The three major indicators of reduced asphalt as well as the physical index of asphalt mixtures are all up to the provisions as required in relevant specification and design. The antioxidants added to the non-petroleum based rejuvenating agent can effectively control the oxidation of aromatic content, which will therefore exist stably in the asphalt for a long time, thereby extending the service life of the recycled pavement. In this invention, the edible recovered oil is treated by either membrane separation, or hydration, or acid refining, or mildew degelation method to separate the colloid and obtain stable raw material. Moreover, its composition is beneficial to asphalt reduction, which is 50% higher than that of traditional petroleum based rejuvenating agent.

4. EMBODIMENTS

The invention provides a non-petroleum based rejuvenating agent. In order to make the purpose of the invention, the technical proposal and the effect more clear and definite, the invention is further described in detail below. It should be understood that, the specific embodiments described herein are used only to explain, but not to limit the invention.

This invention provides a kind of non-petroleum based rejuvenating agent, comprising 40 to 80 percent of treated edible recovered oil, 10 to 50 percent of matrix asphalt, 0.1 to 5 percent of stabilizer and 0.1 to 5 percent of antioxidant.

Further, the matrix asphalt as above-mentioned is either No. 90 or No. 70 road petroleum asphalt. The stabilizer as above-mentioned is diaryl disulfide. The antioxidant as above-mentioned is Tetra [3-(3,5-di-tert-butyl-4-hydroxyphenyl) propionic acid]pentaerythyl alcohol ester, or tri(2,4-di-tert-butylphenyl) phosphite ester, or the both.

Further, the treated edible recovered oil as above-mentioned is obtained from the edible recovered oil by dehydration, slag removal, color removal and flavor removal, and colloid removal processes. Colloid removal process refers to treatment by one of the following methods: membrane separation, hydration, acid refining and mildew degelation.

To further describe the invention, the specific process of preparing the non-petroleum based rejuvenating agent in the invention is as follows:

The edible recovered oil was placed and heated in the reactor in proportion, and continuously stirred in the heating process. When the temperature rose to 80° C.-120° C., the road petroleum asphalt at 100° C.-120° C. was added, and the stirring continued at constant temperature of 100° C.-120° C. for 10-20 minutes. Then, antioxidant was added and stirred constant temperature for 10-20 minutes. After that, stabilizer was added proportionately, continuously stirred and mixed at constant temperature for 60-90 minutes. Finally, the mixture was gradually cooled to room temperature to get the said non-petroleum based rejuvenating agent.

Specifically, the details are explained by the examples below.

Example 1

65% edible recovered oil was placed in the reactor, stirred and preheated to 80° C. No. 90 road petroleum asphalt was preheated to 100° C. 31% No. 90 road petroleum asphalt was added to the reactor, and continuously stirred at constant temperature of 100° C. for 10 min. 2% Tetra [3-(3,5-di-tert-butyl-4-hydroxyphenyl) propionic acid]pentaerythyl alcohol ester and 1.5% tri(2,4-di-tert-butylphenyl) phosphite ester were added to the reactor, and continuously stirred at constant temperature for 10 min. Then, 0.5% diaryl disulfide was added, stirred and mixed at constant temperature for 65 min. The mixture was gradually cooled down to get the said non-petroleum based rejuvenating agent.

Example 2

76% edible recovered oil was placed in the reactor, stirred and preheated to 100° C. No. 90 road petroleum asphalt was preheated to 110° C. 21% No. 90 road petroleum asphalt was added to the reactor, and continuously stirred at constant temperature of 110° C. for 15 min. 1% Tetra [3-(3,5-di-tert-butyl-4-hydroxyphenyl) propionic acid]pentaerythyl alcohol ester and 0.5% tri (2,4-di-tert-butylphenyl) phosphite ester were added to the reactor, and continuously stirred at constant temperature for 15 min. Then, 1.5% diaryl disulfide was added, stirred and mixed at constant temperature for 80 min. The mixture was gradually cooled down to get the said non-petroleum based rejuvenating agent.

Example 3

61% edible recovered oil was placed in the reactor, stirred and preheated to 80° C. No. 70 road petroleum asphalt was preheated to 120° C. 32% No. 90 road petroleum asphalt was added to the reactor, and continuously stirred at constant temperature of 120° C. for 20 min. 3% Tetra [3-(3,5-di-tert-butyl-4-hydroxyphenyl) propionic acid]pentaerythyl alcohol ester and 2% tri(2,4-di-tert-butylphenyl) phosphite ester were added to the reactor, and continuously stirred at constant temperature for 20 min. Then, 2% diaryl disulfide was added, stirred and mixed at constant temperature for 70 min. The mixture was gradually cooled down to get the said non-petroleum based rejuvenating agent.

To demonstrate the compliance of the non-petroleum based rejuvenating agent in the invention with the specification and standard for rejuvenating agents, the measured indicators of the non-petroleum based rejuvenating agent in the invention are listed below, as shown in Table 1.

TABLE 1

| Item | Normative standards | Example 1 | Example 2 | Example 3 |
| --- | --- | --- | --- | --- |
| 60° C. Viscosity cSt | Type RA-1: 50-175 | 71 | 68 | 70 |
| Flash Point (° C.) | ≥220 | 276 | 281 | 278 |
| Saturated Content (%) | ≤30 | 15.4 | 15.9 | 15.5 |
| Aromatic Content (%) | Actually measured | 34 | 36 | 32 |
| Ratio of Viscosity Before and After Thin-Film Oven Test | ≤3 | 1.2 | 1.1 | 1.2 |
| Change of Mass Before and After Thin-Film Oven Test (%) | ≤4, ≥−4 | −0.8 | −0.9 | −0.8 |
| 15° C. Density | Actually measured | 0.940 | 0.942 | 0.941 |

To further express the advanced nature of the non-petroleum based rejuvenating agent in the invention, the results of examples 1, 2 and 3 are compared with that of the petroleum-based rejuvenating agent before and after the recycling of aged asphalt, as shown in Table 2.

TABLE 2

| Asphalt Index | | Penetration (mm) | Ductility (cm) | Softening Point (° C.) |
| --- | --- | --- | --- | --- |
| Criteria of Recycled Asphalt | | 60-80 | Actually measured | ≥46 |
| Undisturbed Aged Asphalt | | 13.1 | 0 | 70.4 |
| Undisturbed Aged Asphalt Mixing Ratio 12% | Petroleum Based Rejuvenating Agent | 32.1 | 11.2 | 56.7 |
| | Example 1 | 79.4 | >100 | 49.7 |
| | Example 2 | 80.9 | >100 | 49.7 |
| | Example 3 | 79.2 | 98.0 | 49.6 |

By the comparison, it is shown that that the reduction ability of the non-petroleum based rejuvenating agent in the invention is about 50% higher than that of the petroleum-based rejuvenating agent, which is a great progress of existing technology.

No matter in the hot in-place recycling project or in the central plant hot recycling project, the production of non-petroleum based rejuvenating agent can be completed without limitation of site, personnel or other factors, provided that an reactor with heating and stirring function, all kinds of raw materials mixed in given proportion, sufficient heating temperature and stirring time are guaranteed.

As for the hot in-place recycling, the prepared non-petroleum based rejuvenating agent is only required to be filled into the recycling unit in advance; and during the central plant hot recycling, the non-petroleum based rejuvenating agent may be delivered to the mixing cylinder through the pipeline for blending.

In the invention, the adjustment of the blending proportion for the raw materials and the selection of the matrix asphalt depend on the service life and design of the original pavement, and the design criteria of new pavement. According to the technical standard desired in different pavement designs, the blending ratio of raw materials for the non-petroleum based rejuvenating agent in the patent is adjusted, so that the reduction of non-petroleum based rejuvenating agent is more targeted and purposeful, suitable for the heat recycling projects of different regions.

Of course, the above descriptions are only better embodiments of the invention, and this invention is not limited to the above-listed embodiments. It should be stated that, all equivalent alternatives and obvious variants made by any technician familiar with the field under the instruction of this specification will fall within the substantive scope of this specification, which should be protected by the invention.

The invention claimed is:

1. A non-petroleum based rejuvenating agent applied to hot recycling asphalt concrete, characterized by comprising the following components in percentage: 40 to 80 percent of treated edible recovered oil, 10 to 50 percent of matrix asphalt, 0.1 to 5 percent of stabilizer, and 0.1 to 5 percent of antioxidant; wherein the treated edible recovered oil is obtained from edible recovered oil treated by dehydration, slag removal, color removal and flavor removal, and colloid removal processes.

2. The non-petroleum based rejuvenating agent according to claim 1, wherein the matrix asphalt is No. 90 road petroleum asphalt or No. 70 road petroleum asphalt.

3. The non-petroleum based rejuvenating agent according to claim 1, wherein the stabilizer is diaryl disulfide.

4. The non-petroleum based rejuvenating agent according to claim 1, where the antioxidant is Tetra [3-(3,5-di-tert-butyl-4-hydroxyphenyl) propionic acid] pentaerythyl alcohol ester, or tri(2,4-di-tert-butylphenyl) phosphite ester, or both.

5. The non-petroleum based rejuvenating agent according to claim 1, wherein the colloid removal process is treatment by one of: membrane separation, hydration, acid refining and mildew degelation.

* * * * *